US011013190B2

(12) United States Patent
Zhang et al.

(10) Patent No.: US 11,013,190 B2
(45) Date of Patent: May 25, 2021

(54) IRRIGATION METHOD AND DEVICE BASED ON WATER USAGE CHARACTERISTICS AND REAL-TIME WEATHER CONDITION DURING DIFFERENT CROP GROWTH STAGES

(71) Applicant: China institute of water resources and hydropower research, Beijing (CN)

(72) Inventors: Baozhong Zhang, Beijing (CN); He Chen, Beijing (CN); Lijuan Du, Beijing (CN); Zheng Wei, Beijing (CN); Zhigong Peng, Beijing (CN); Jiabing Cai, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 194 days.

(21) Appl. No.: 16/503,628

(22) Filed: Jul. 5, 2019

(65) Prior Publication Data

US 2020/0359581 A1  Nov. 19, 2020

(30) Foreign Application Priority Data

May 13, 2019 (CN) .......................... 201910394896.9

(51) Int. Cl.
*A01G 25/16* (2006.01)
*G06Q 50/06* (2012.01)

(52) U.S. Cl.
CPC ........... *A01G 25/167* (2013.01); *G06Q 50/06* (2013.01)

(58) Field of Classification Search
None
See application file for complete search history.

(56) References Cited

U.S. PATENT DOCUMENTS

| 2016/0183483 | A1* | 6/2016 | Motohari Sharif | A01G 25/165 |
| | | | | 700/284 |
| 2017/0223910 | A1* | 8/2017 | Grossman | G05D 7/0635 |
| 2017/0318761 | A1* | 11/2017 | Rainone | H04W 4/70 |

* cited by examiner

*Primary Examiner* — Paul B Yanchus, III
(74) *Attorney, Agent, or Firm* — Bayramoglu Law Offices LLC

(57) ABSTRACT

According to an irrigation method based on water usage characteristics and real-time weather condition during different crop growth stages, whether the crops are in a shortage of water in the growth is determined based on an actual soil water content, a water usage amount of the crops during the given growth stage, and a rainfall amount during the next day. If the shortage of water occurs, the actual water usage amount of the crops is calculated, and a water pump can be self-adaptively turned on to water the crops and an administrator is informed when the reservoir has an insufficient water storage, according to the relation between the water storage amount of the reservoir and the actual water usage amount.

13 Claims, 4 Drawing Sheets

IRRIGATION METHOD AND DEVICE BASED ON WATER USAGE CHARACTERISTICS AND REAL-TIME WEATHER CONDITION DURING DIFFERENT CROP GROWTH STAGES

CROSS REFERENCE TO RELATED APPLICATIONS

This application is based upon and claims priority to Chinese Patent Application No. 201910394896.9, filed on May 13, 2019 the entire contents of which are incorporated herein by reference.

TECHNICAL FIELD

The present invention relates to the agricultural irrigation technology, specifically to an irrigation method and device based on water usage characteristics and real-time weather condition during different crop growth stages.

BACKGROUND

Water plays an important role in the growth of crops. Crops use different amount of water during different growth stages. The amount of water used from rainfall accounts for merely a quarter of the amount of water used over the whole growth period of crops.

Nowadays, in China the crop irrigation methods mainly include sprinkler irrigation and in irrigation (including drip irrigation, spray irrigation, bubbler irrigation, and subsurface irrigation). In the practice of these two methods, usually, the irrigation devices are manually turned on based on the operator's observations of the weather conditions or the irrigation devices are automatically turned on at regular time intervals.

Since crops have varying water usage during different growth stages, regularly irrigating with the constant amount of water will cause over irrigation during some growth stages and a waste of the water resource, while causing insufficient irrigation during some growth stages where more water is required. Therefore, the existing sprinkler irrigation and micro-irrigation having a constant water outflow cannot precisely fit the water usage of the crops during different growth stages, and have a poor irrigation effect.

SUMMARY

To overcome the above-mentioned drawbacks of the prior art, the present invention provides an irrigation method and device based on water usage characteristics and real-time weather condition during the crop growth stages, which is capable of realizing precise irrigation based on the water usage of the crops during different growth stages and the rainfall reported by the real-time weather condition.

To this end, the present invention employs the following technical solutions.

In a first aspect, the present invention provides an irrigation method based on water usage characteristics and real-time weather conditions during crop growth stages which includes:

S1: receiving moisture content data transmitted by a plurality of soil moisture sensors buried at a first depth in a field, and calculating an average of the moisture content data of all the soil moisture sensors to be regarded as an actual soil moisture content;

S2: reading a planting date of crops and a current date to locate a current growth stage of the crops;

S3: reading a water usage amount of the crops during the current growth stage stored in a PLC (Programmable Logic Controller) integrated machine;

S4: determining whether the actual soil moisture content is greater than or equal to the water usage amount of the crops during the current growth stage, if yes, return to step S1, otherwise, go to step S5;

S5: reading a rainfall amount within a first time duration starting from the current date as reported by a weather forecast and calculating a sum of the rainfall amount and the actual soil moisture content;

S6: determining whether the sum is greater than or equal to the water usage amount of the crops during the current growth stage; if yes, return to step S1, otherwise, go to step S7;

S7: calculating a difference between the sum and the water usage amount, and calculating an actual water usage amount required in the irrigation based on the difference and a plating area of the crops;

S8: receiving a water level measured by a float type level meter of a reservoir in the field, and calculating a water storage volume of the reservoir based on the water level and an area of the reservoir;

S9: comparing the water storage volume of the reservoir and the actual water usage amount;

S10: if the water storage volume of the reservoir is greater than the actual water usage amount, turning on a control switch connecting a water pump and a storage battery, turning on an electromagnetic valve on drip irrigation delivery lines to water the crops, till an outflow water amount measured by a flow meter provided at an output end of the water pump is equal to the actual water usage amount, stopping the irrigation and return to step S1;

S11: if the water storage volume of the reservoir is greater than or equal to 30% of the actual water usage amount and is less than or equal to the actual water usage amount, reminding an administrator to fill the reservoir with water, at the same time, turning on the control switch connecting the water pump and the storage battery, turning on the electromagnetic valve on the drip irrigation delivery lines to water the crops, then go to step S12;

S12: if the outflow water amount measured by the flow meter at the output end of the water pump is greater than 80% of the water storage volume of the reservoir, determining whether the water level information reported by the float type level meter is lower than a water level threshold, if yes, go to step S13, otherwise, go to step S14;

S13: turning off the control switch and the electromagnetic valve on the drip irrigation delivery lines, recording the outflow water amount, and keep reminding the administrator to fill water in the reservoir, then go to step S14;

S14: determining whether the water level information reported by the float type level meter is lower than the water level threshold after a second time duration, if yes, reminding the administrator to fill water in the reservoir again, then going on with performing step S14, otherwise, turning on the control switch connecting the water pump and the storage battery, turning on the electromagnetic valve on the drip irrigation delivery lines, and go to step S15;

S15: irrigating till the water outflow volume measured by the flow meter at the output end of the water pump is equal to the actual water usage amount, stopping the irrigation and returning to step S1; and S16: if the water storage volume of the reservoir is less than 30% of the actual water usage amount, reminding the administrator to fill water in the reservoir, then return to step S8.

In a second aspect, the present invention provides an irrigation device for the irrigation method based on water usage characteristics and real-time weather condition during different crop growth stages, which includes a reservoir, a machine room, and drip irrigation delivery lines distributed on a ground surface in the field, flexible solar panels are laid on a roof of the machine room, the flexible solar panels are electrically connected to a storage battery in the machine room through a solar charge controller;

a top of the reservoir is connected to an arc-shaped plastic cover through a pull rope, a diameter of the arc-shaped plastic cover is 1 cm less than that of the reservoir; an edge around the arc-shaped plastic cover is provided with a blocking annulus protruded upward with a height of 1 cm, a float type level meter is provided inside the reservoir;

a water pump and a PLC integrated machine storing water usage amounts of crops during different growth stages and a planting date of the crops are placed in the machine room, a water inlet pipe connected to an input end of the water pump extends to a bottom of the reservoir, and an end of the water inlet pipe located inside the reservoir is provided with a spherical filter net;

a water outlet pipe connected to an output end of the water pump is connected to a pipe connector, a main water pipe of the drip irrigation delivery lines is fixedly connected to the pipe connector, the water outlet pipe is provided with a flow meter, a joint between the main water pipe and the pipe connector is provided with an electronic valve; a plurality of soil moisture sensors are buried at a first depth in the field within a crop planting range; and the water pump is respectively connected to the storage battery and a municipal power supply through a control switch, an electrical quantity sensor is respectively connected to the storage battery and the PLC integrated machine, the soil moisture sensors, the float type level meter, the control switch, the solar charge controller, the electromagnetic valve, and the water pump are all connected to the PLC integrated machine.

The present invention has the following advantages. According to the technical solution of the present invention, when irrigating the crops, the actual water usage amount of the crops can be calculated based on the water usage amount of the crops during different growth stages, the soil moisture contents, and the rainfall amount, and the crops are irrigated according to the actual water usage amount. Therefore, a sufficient water source is ensured during every growth stages of the crops, a best growth condition can be achieved, and the yield of the crops is improved ultimately.

In the specific irrigation processes, according to the present technical solutions, the water pump can be turned on according to the water storage volume of the reservoir and the actual water usage amount of the crops. In this way, the crops can be supplied with water timely when there is a shortage of water in the reservoir, while the administrator is being reminded. Moreover, the water pump can be prevented from idling, ensuring safety of the water pump.

Figure 1:
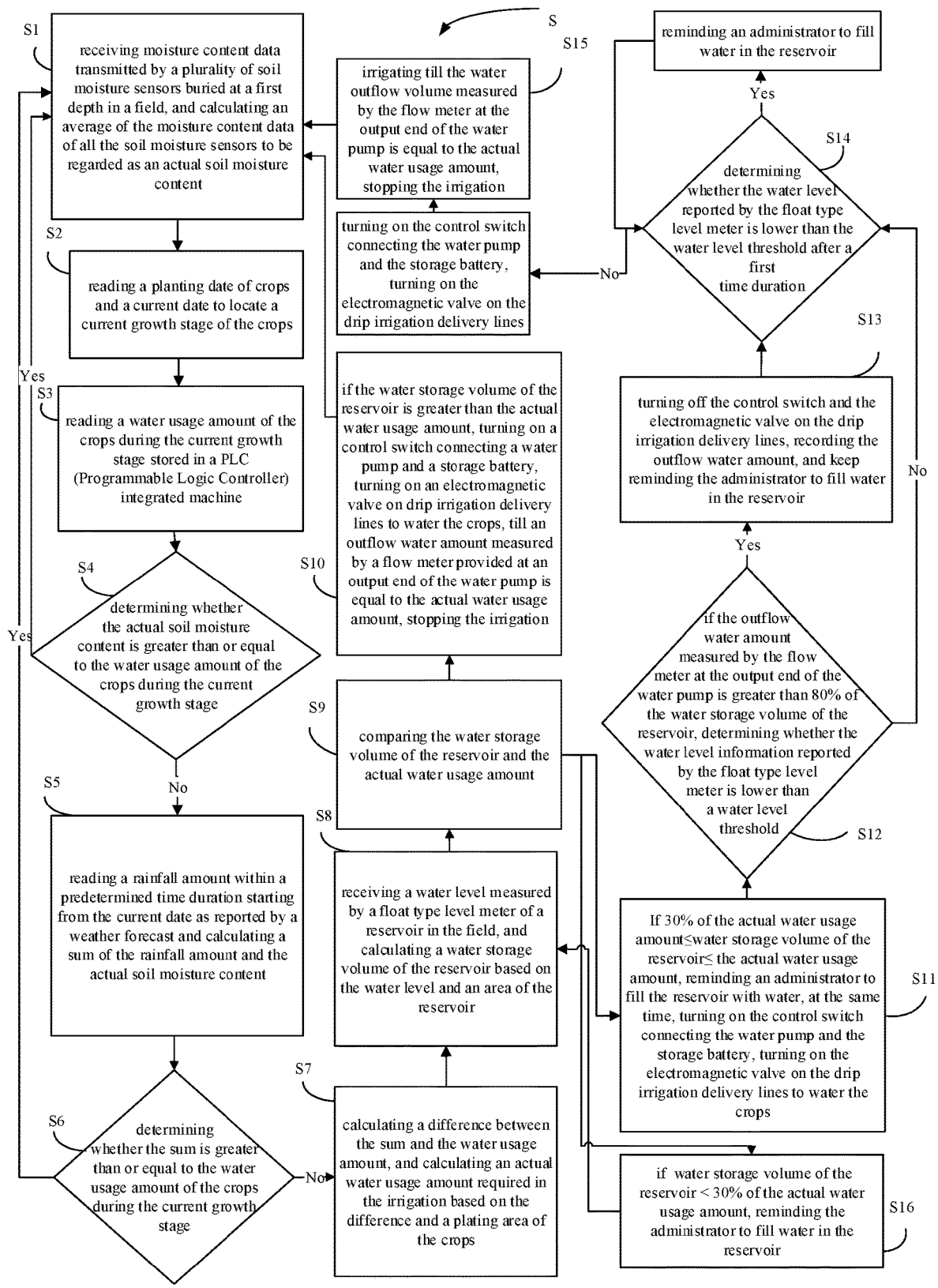
FIG. 1 is a flow diagram showing an irrigation method based on water usage characteristics and real-time weather condition during different crop growth stages.

In the drawings: 1, reservoir; 11, pull rope; 12, arc-shaped plastic cover; 121, blocking annulus; 122, pull rope; 2, machine room; 21, flexible solar panel; 22, storage battery; 23, water pump; 24, water inlet pipe; 241, spherical filter net; 25, water outlet pipe; 251, pipe connector; 252, flow meter; 253, electromagnetic valve; 26, PLC integrated machine; 3, drip irrigation delivery lines; 31, main water pipe; 4, spray pipe; 5, main pipeline; 6, support bracket; 61, base; 611, clamping claw; 62, retractable rod.

DETAILED DESCRIPTION OF THE EMBODIMENTS

The specific embodiments of the present invention will be described hereinafter for those skilled in the art to understand the present invention. It should be noted that the present invention is not limited to the scope of the specific embodiments. As for those skilled in the art, as long as the various variations fall within the spirit and scope of the present invention as defined and determined by the appended claims, and these variations are obvious, all such inventions derived from the idea of the present invention are covered by the present invention.

With reference to FIG. 1, FIG. 1 is a flow diagram showing an irrigation method based on water usage characteristics and real-time weather condition during different crop growth stages. As shown in FIG. 1, the irrigation method S includes steps from S1 to S16.

In step S1, the moisture content data transmitted by a plurality of soil moisture sensors buried at a first depth in the field is received, and an average of the moisture content data of all soil moisture sensors is calculated to be regarded as the actual soil moisture content. Here, the first depth is 10 cm, namely, the soil moisture sensors are 10 cm away from the surface of the ground.

In step S2, a planting date of the crops and a current date are read to locate a current growth stage of the crops. Assuming that the crop is a winter wheat, the plating date is October 15, and the current date is February 15. The winter wheat is during a reviving stage as determined by the interval between the two dates.

In step S3, the water usage amount of the crops during the current growth stage stored in the PLC (Programmable Logic Controller) integrated machine is read. Assuming that the crop is the winter wheat, the winter wheat is during the reviving stage, then the water usage amount of the winter wheat during the reviving stage stored in the PLC integrated machine 26 can be directly read.

In step S4, whether the actual soil moisture content is greater than or equal to the water usage amount of the crops during the current growth stage is determined, if yes, return to step S1, otherwise, go to step S5.

In step S5, the rainfall amount within a first time duration starting from the current date as reported by a weather forecast is read, and a sum of the rainfall amount and the actual soil moisture content is calculated. Here, the first time duration is set as 3 days or 7 days. Namely, the rainfall amount of the next three days or the next seven days starting from the current date as reported by the weather forecast is read.

In step S6, whether the sum is greater than or equal to the water usage amount of the crops during the current growth stage is determined, if yes, return to step S1, otherwise, go to step S7.

In step S7, a difference between the sum and the water usage amount is calculated, and an actual water usage amount in the irrigation is calculated based on the difference and a plating area of the crops.

In step S8, a water level measured by a float type level meter of the reservoir 1 in the field is received, and a water storage volume of the reservoir 1 is calculated based on the water level and an area of the reservoir 1.

In step S9, the water storage volume of the reservoir 1 and the actual water usage amount are compared.

In step S10, if the water storage volume of the reservoir 1 is greater than the actual water usage amount, a control switch connecting the water pump 23 and the storage battery 22 is turned on, and the electromagnetic valve 253 on the drip irrigation delivery lines 3 are turned on to irrigate the crop, till an outflow water amount measured by the flow meter 252 provided at an output end of the water pump 23 is equal to the actual water usage amount, then stop the irrigation and return to step S1.

In step S11, if the water storage volume of the reservoir 1 is greater than or equal to 30% of the actual water usage amount and is less than the actual water usage amount, an administrator is reminded to fill water in the reservoir. At the same time, the control switch connecting the water pump 23 and the storage battery 22 is turned on, and the electromagnetic valve 253 on the drip irrigation delivery lines 3 is turned on to irrigate the crops, then go to step S12.

In step S12, if the outflow water amount measured by the flow meter 252 at the output end of the water pump 23 is greater than 80% of the water storage volume of the reservoir 1, whether the water level information reported by the float type level meter is lower than a water level threshold is determined, if yes, turn to step 13, otherwise, go to step S14.

In step S13, the control switch and the electromagnetic valve 253 on the drip irrigation delivery lines 3 are turned off, and the outflow water amount is recorded. Besides, the administrator is being continuously reminded to fill water in the reservoir 1. Then, go to step S14.

In step S14, whether the water level information reported by the float type level meter is lower than the water level threshold is determined after the second time duration (1 hour), if yes, the administrator is reminded to fill water in the reservoir 1 again, then continue to perform step S14; otherwise, the control switch connecting the water pump 23 and the storage battery 22 is turned on, and the electromagnetic valve 253 on the drip irrigation delivery lines 3 is turned on, then go to step S15.

In step S15, go on irrigating till the outflow water amount measured by the flow meter 252 at the output end of the water pump 23 is equal to the actual water usage amount; then the irrigation is stopped and go to step S1.

In step S16, if the water storage amount of the reservoir 1 is less than 30% of the actual water usage amount, the administrator is reminded to fill water in the reservoir 1, and then return to step S8.

In one embodiment of the present invention, before turning on the control switch connecting the water pump 23 and the storage battery 22 and turning on the electromagnetic valves 253 on the drip irrigation delivery lines 3 in step S10, step S11, and step S14, the following steps are further included.

A1: the soil temperature data transmitted by a plurality of first temperature sensors buried at a second depth in the field is received, and an average of the soil temperature data of all the first soil temperature sensors is calculated to be regarded as the actual soil temperature;

A2: whether the actual soil temperature is greater than or equal to the soil temperature threshold is determined, if yes, return to step A1; otherwise, go to step S10.

With the design of determining the actual temperature in the present technical solution, the case, where the crops are directly irrigated when the water shortage of crops is observed in the high-temperature daytime, causing damages to the roots of the crops when the high-temperature soil comes in contact with the water, is avoided.

In the implementation, preferably, the present technical solution further includes the following steps between the start of the water pump 23 for irrigation and the stop of the irrigation.

B1: the electrical quantity of the storage battery 22 is measured in real time, and whether the electrical quantity is lower than the electrical quantity threshold is determined, if yes, go to step B2; otherwise, go on performing step B1;

B2: the control switch connecting the water pump 23 and the storage battery 22 is turned off, and a control switch connecting the water pump 23 and the municipal power supply is turned on; and B3: if the outflow water amount measured by the flow meter 252 at the output end of the water pump 23 is equal to the actual water usage amount, the control switch connecting the water pump 23 and the municipal power supply is turned off.

During the irrigation, the water pump 23 needs to deliver the water in the reservoir 1 to the drip irrigation delivery lines in the field for drip irrigation. Since the water is pumped over a far range and the water pump 23 has a high power, the operation is power-consuming. By measuring the electrical quantity of the storage battery 22, on one hand, the storage battery 22 is prevented from excessively discharging which thereby affects its service life; on the other hand, the irrigation is prevented from the halt due to sudden power off and failure to switch the power supply mode in time.

In one embodiment of the present invention, the irrigation method of the present invention further includes the following steps.

C1: the air temperature data transmitted by a plurality of second temperature sensors arranged among the crops through the support bracket 6 is received, and an average of the air temperatures of all the second air temperature sensors is calculated to be regarded as the actual air temperature;

C2: whether the actual air temperature is greater than or equal to the air temperature threshold is determined, if yes, go to step C3; otherwise, return to step C1; and C3: the control switch connecting the water pump 23 and the storage battery 22 is turned on, and the electromagnetic valve 253 on the main pipeline 5 connected to the spray pipe 4 is turned on to spray water on the crop leaves for cooling, till the working time of the water pump 23 reaches the third time duration (10 minutes), then water spraying is stopped.

According to the present technical solution, the air temperature is further determined to avoid withering leaves due to excessive evaporation of the crops as a result of hot weather, which thus suppresses the photosynthesis of leaves. Water from the spray pipe 4 can moisturize the leaves while cool down air above the surface of the ground, so as to provide the crops with the best growth condition.

Figure 2:
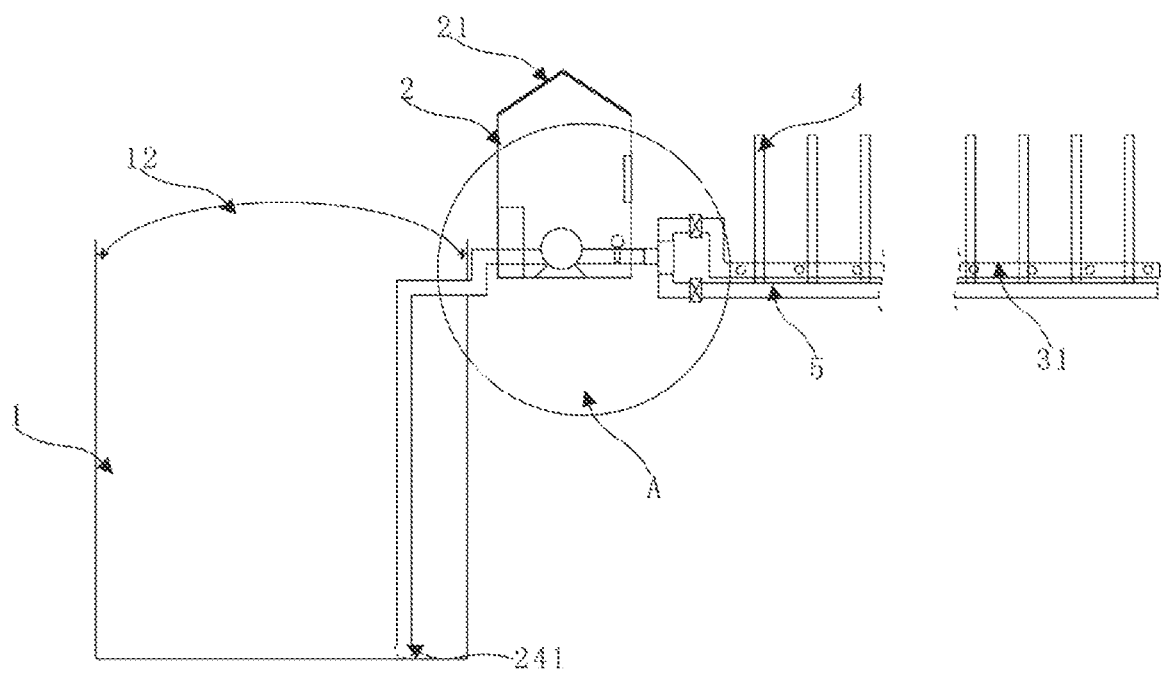
FIG. 2 is a structural schematic diagram showing an irrigation device based on water usage characteristics and real-time weather condition during different crop growth stages.
Figure 3:
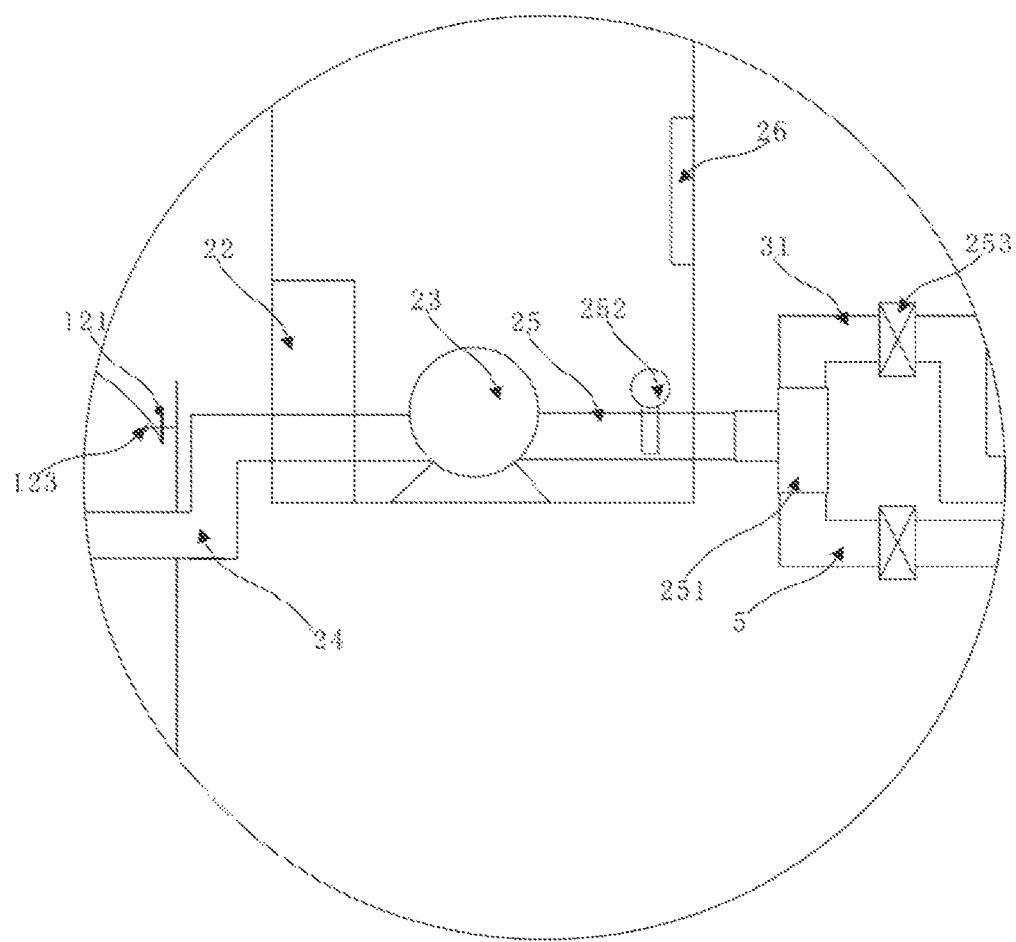
FIG. 3 is an enlarged view of part A shown in FIG. 2.

As shown in FIG. 2 and FIG. 3, the present technical solution further provides an irrigation device for the irrigation method based on water usage characteristics and real-time weather condition during different crop growth stages, which includes the reservoir 1, the machine room 2, and the drip irrigation delivery lines distributed on the ground surface in the field. The flexible solar panels 21 are laid on the roof of the machine room 2, and the flexible solar panels 21 are electrically connected to the storage battery 22 in the machine room 2 through a solar charge controller.

The top of the reservoir 1 is connected to the arc-shaped plastic cover 12 through the pull rope 11. A diameter of the arc-shaped plastic cover 12 is 1 cm less than that of the reservoir 1. An edge around the arc-shaped plastic cover 12 is provided with a blocking annulus 121 which protrudes upward with a height of 1 cm. The reservoir 1 is provided with a float type level meter.

The arc-shaped plastic cover 12 is provided to prevent large-size particle impurities from entering the reservoir 1 or the water pump 23 to affect the service life of the blades of the water pump 23. By setting the size of the arc-shaped plastic cover 12, rainwater can enter the reservoir 1 smoothly while the evaporation rate of water in the reservoir 1 is reduced. By setting the blocking annulus 121 with the given size, the rainwater can enter the reservoir 1 smoothly, while the large-size particle impurities moving with the rainwater can be blocked.

In the implementation, preferably, the top surface of the arc-shaped plastic cover 12 is provided with a white reflective coating layer in the present technical solution. The configuration of the white reflective coating layer can further reduce the evaporation rate of water in the reservoir 1.

The machine room 2 is provided with the water pump 23 and the PLC integrated machine 26 storing the water usage amount of the crop during different growth stages and the planting dates of the crop. The water inlet pipe 24 connected to an input end of the water pump 23 extends to the bottom of the reservoir 1, and an end of the water inlet pipe 24 located inside the reservoir 1 is provided with the spherical filter net 241.

Figure 5:
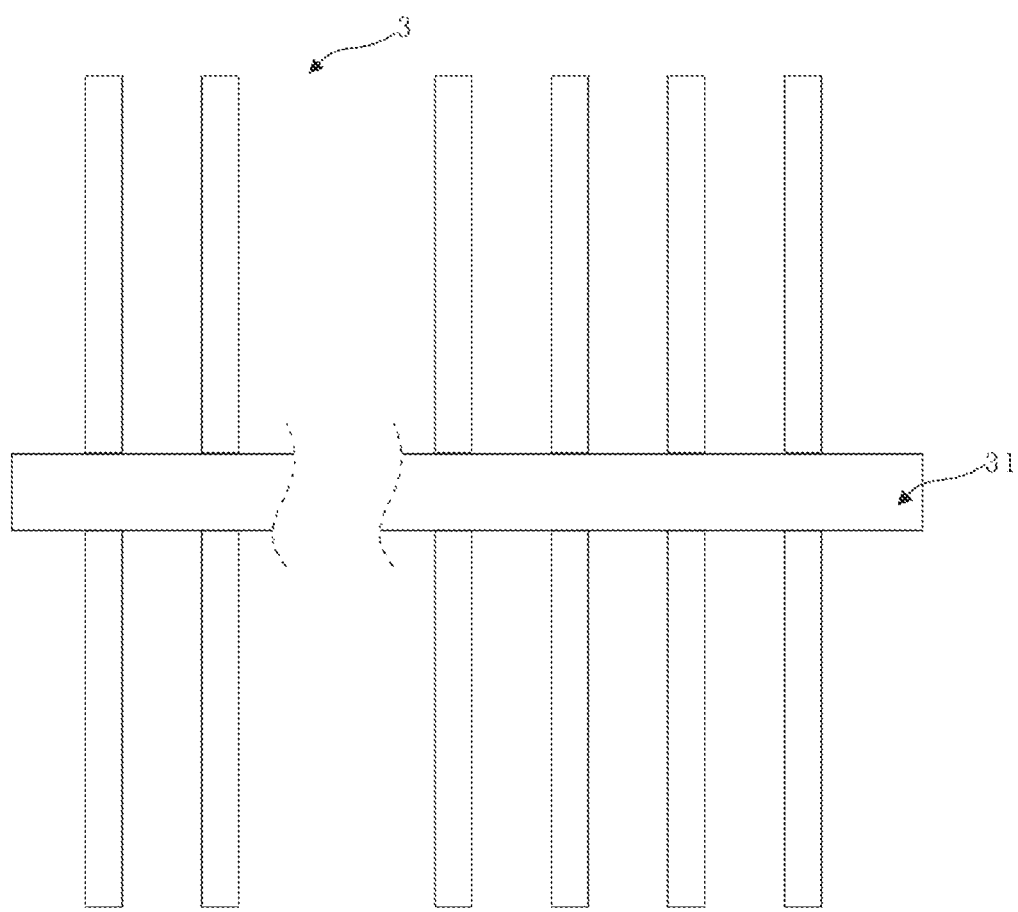
FIG. 5 is a schematic diagram of drip irrigation delivery lines.

The water outlet pipe 25 connected to the output end of the water pump 23 is connected to the pipe connector 251. The main water pipe 31 of the drip irrigation delivery lines 3 (the schematic diagram of the drip irrigation delivery lines 3 may be referred in FIG. 5) is fixedly connected to the pipe connector 251. The water outlet pipe 25 is provided with the flow meter 252. The joint between the main water pipe 31 and the pipe connector 251 is provided with the electronic valve 253. A plurality of soil moisture sensors are buried at the first depth in the field within the crop planting range.

The water pump 23 is respectively connected to the storage battery 22 and the municipal power supply through a control switch. The electrical quantity sensor is respectively connected to the storage battery and the PLC integrated machine. The soil moisture sensor, the float type level meter, the control switch, the solar charge controller, the electromagnetic valve 253, and the water pump 23 are all connected to the PLC integrated machine 26. The soil moisture sensor is a TDR-3 soil moisture sensor. The float type level meter is a WFH-2A float type level meter. The type of the flow meter is SG-NZ-KD1. The electrical quantity sensor is an RCS07D open-loop Hall-effect current sensor.

In the implementation, preferably, a plurality of first temperature sensors are buried at a second depth in the field within the crop planting range. The first temperature sensors are connected to the PLC integrated machine 26.

With the first temperature sensors, the case, where the crops are directly irrigated when the water shortage of crops is observed in the high-temperature daytime, causing damages to the roots of the crops when the high-temperature soil comes in contact with the water, is avoided.

The irrigation device of the present technical solution further includes a plurality of spray pipes 4 distributed in the field. All the spray pipes 4 are connected to the main pipeline 5 buried underground. The pipe connector 251 is a three-way pipe, where one of the water outlet ports is connected to the main water pipe 31, and the other water outlet port is connected to the main pipeline 5. An end of the main pipeline 5 connecting to the water outlet port is provided with the electromagnetic valve 253 connected to the PLC integrated machine 26.

With the spray pipes 4, the crops can be irrigated either in the drip irrigation manner or in the spray irrigation manner. Therefore, the irrigation methods can be flexibly shifted according to the crops planted in different seasons.

Figure 4:
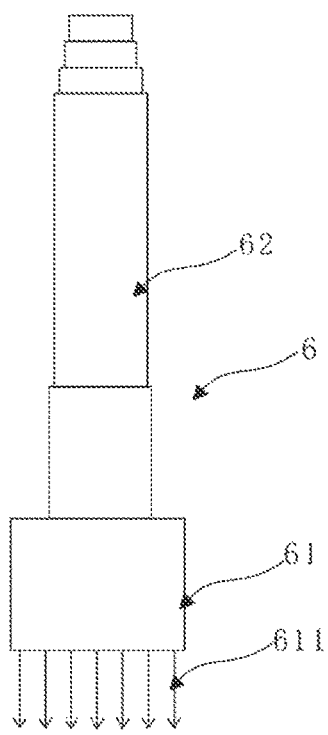
FIG. 4 is a structural schematic diagram of a support bracket.

As shown in FIG. 3, according to the present technical solution, the irrigation device further includes a plurality of second temperature sensors which are evenly distributed among the crops and can communicate with the PLC integrated machine 26. As shown in FIG. 4, the support bracket 6 includes the base 61 and the telescopic rod 62 fixed on the base 61. Each of the second temperature sensors is mounted at the top end of the telescopic rod 62. The bottom of the base 61 is provided with a plurality of clamping claws 611.

The combination of the spray pipes 4, the second temperature sensors, and the PLC integrated machine 26 can reduce the ambient temperature of crops when the temperature is relatively high, keeping the best soil conditions and air conditions for the growth of crops. The first temperature sensors and the second temperature sensors are both at the type of WRM-101.

Since the crops during different growth stages have different heights, the configuration of the telescopic rod 62 enables a manual adjustment on the height of the telescopic rod 62 when the crops come to the next growth stage, so that the temperature data measured by the second temperature sensors is the best reflection of the ambient temperature of the crops.

In the implementation, according to the present technical solution, the telescopic rod 62 being an electronic push rod connected to the storage battery 22 and the PLC integrated machine 26 is preferred. By using the electronic push rod, the extension of the electronic push rod can be adjusted through the PLC integrated machine 26 without manual adjustment, reducing labor intensity.

What is claimed is:

1. An irrigation method based on water usage characteristics and real-time weather condition during different crop growth stages comprising:
    S1: receiving moisture content data transmitted by a plurality of soil moisture sensors buried at a first depth in a field, and calculating an average of the moisture content data of all the soil moisture sensors to be regarded as an actual soil moisture content;
    S2: reading a planting date of crops and a current date to locate a current growth stage of the crops;
    S3: reading a water usage amount of the crops during the current growth stage stored in a PLC integrated machine;
    S4: determining whether the actual soil moisture content is greater than or equal to the water usage amount of the crops during the current growth stage, if yes, return to step S1, otherwise, go to step S5;

S5: reading a rainfall amount within a first time duration starting from the current date reported by a weather forecast and calculating a sum of the rainfall amount and the actual soil moisture content;

S6: determining whether the sum is greater than or equal to the water usage amount of the crops during the current growth stage; if yes, return to step S1, otherwise, go to step S7;

S7: calculating a difference between the sum and the water usage amount, and calculating an actual water usage amount required in the irrigation based on the difference and a planting area of the crops;

S8: receiving a water level measured by a float type level meter of a reservoir in the field, and calculating a water storage volume of the reservoir based on the water level and an area of the reservoir;

S9: comparing the water storage volume of the reservoir and the actual water usage amount;

S10: if the water storage volume of the reservoir is greater than the actual water usage amount, turning on a control switch connecting a water pump and a storage battery, turning on an electromagnetic valve on drip irrigation delivery lines to water the crops, till an outflow water amount measured by a flow meter provided at an output end of the water pump is equal to the actual water usage amount, stopping the irrigation and return to step S1;

S11: if the water storage volume of the reservoir is greater than or equal to 30% of the actual water usage amount and is less than or equal to the actual water usage amount, reminding an administrator to fill water in the reservoir, at the same time, turning on the control switch connecting the water pump and the storage battery, turning on the electromagnetic valve on the drip irrigation delivery lines to water the crops, then go to step S12;

S12: if the outflow water amount measured by the flow meter at the output end of the water pump is greater than 80% of the water storage volume of the reservoir, determining whether the water level reported by the float type level meter is lower than a water level threshold, if yes, go to step S13, otherwise, go to step S14;

S13: turning off the control switch and the electromagnetic valve on the drip irrigation delivery lines, recording the outflow water amount, and keeping reminding the administrator to fill water in the reservoir, then go to step S14;

S14: determining whether the water level reported by the float type level meter is lower than the threshold water level after a second time duration, if yes, reminding the administrator to fill water in the reservoir again, then going on with performing step S14, otherwise, turning on the control switch connecting the water pump and the storage battery, turning on the electromagnetic valve on the drip irrigation delivery lines, and go to step S15;

S15: keeping the irrigation till the water outflow volume measured by the flow meter at the output end of the water pump is equal to the actual water usage amount, stopping the irrigation and return to step S1; and S16: if the water storage volume of the reservoir is less than 30% of the actual water usage amount, reminding the administrator to fill water in the reservoir, then return to step S8.

2. The irrigation method based on water usage characteristics and real-time weather condition during different crop growth stages according to claim 1, wherein before turning on the control switch connecting the water pump and the storage battery and turning on the electromagnetic valve on the drip irrigation delivery lines in step S10, step S11, and step S14, the method further comprises:

A1: receiving soil temperature data transmitted by a plurality of first temperature sensors buried at a second depth in the field, and calculating an average of the soil temperature data of all the first soil temperature sensors to be regarded as an actual soil temperature; and A2: determining whether the actual soil temperature is greater than or equal to a soil temperature threshold, if yes, return to step A1, otherwise, go to step S10.

3. The irrigation method based on water usage characteristics and real-time weather condition during different crop growth stages according to claim 1, wherein during a period from turning on the water pump for irrigation to stopping the irrigation, the method further comprises:

B1: measuring an electrical quantity of the storage battery in real time, and determining whether the electrical quantity is lower than an electrical quantity threshold, if yes, go to step B2, otherwise, go on performing step B1;

B2: turning off the control switch connecting the water pump and the storage battery, and turning on a control switch connecting the water pump and a municipal power supply; and B3: if the water outflow amount measured by the flow meter at the output end of the water pump is equal to the actual water usage amount, turning off the control switch connecting the water pump and the municipal power supply.

4. The irrigation method based on water usage characteristics and real-time weather condition during different crop growth stages according to claim 1, wherein the method further comprises:

C1: receiving air temperature data transmitted by a plurality of second temperature sensors distributed among the crops through a support bracket, and calculating an average of the air temperature data of all the second air temperature sensors to be regarded as an actual air temperature;

C2: determining whether the actual air temperature is greater than or equal to a predetermined air temperature, if yes, go to step C3, otherwise, return to step C1; and C3: turning on the control switch connecting the water pump and the storage battery, turning on an electromagnetic valve on a main pipeline connected to a plurality of spray pipes to spray water on crop leaves for cooling, till a working time of the water pump reaches a third time duration, and stopping spraying water.

5. An irrigation device for the irrigation method based on water usage characteristics and real-time weather condition during different crop growth stages according to claim 1 comprising a reservoir, a machine room, and drip irrigation delivery lines distributed on a ground surface in a field; wherein flexible solar panels are laid on a roof of the machine room, the flexible solar panels are electrically connected to a storage battery in the machine room through a solar charge controller;

a top of the reservoir is connected to an arc-shaped plastic cover through a pull rope, a diameter of the arc-shaped plastic cover is 1 cm less than a diameter of the reservoir; an edge around the arc-shaped plastic cover is provided with a blocking annulus protruded upward with a height of 1 cm, a float type level meter is arranged inside the reservoir;

the machine room is provided with a water pump and a PLC integrated machine storing water usage amounts of crops during the different growth stages and a planting date of the crops, a water inlet pipe connected to an input end of the water pump extends to a bottom of the reservoir, and an end of the water inlet pipe located inside the reservoir is provided with a spherical filter net;

a water outflow pipe connected to an output end of the water pump is connected to a pipe connector, a main water pipe of the drip irrigation delivery lines is fixedly connected to the pipe connector, the water outflow pipe is mounted with the flow meter, an end of the main water pipe connecting to the pipe connector is provided with an electronic valve; a plurality of soil moisture sensors are buried at a first depth in the field within a crop planting range; and the water pump is respectively connected to the storage battery and a municipal power supply through a control switch, an electrical quantity sensor is respectively connected to the storage battery and the PLC integrated machine, and the soil moisture sensors, the float type level meter, the control switch, the solar charge controller, the electromagnetic valve, and the water pump are all connected to the PLC integrated machine.

6. The irrigation device according to claim 5, wherein a plurality of first temperature sensors are buried at a second depth in the field within the crop planting range, and the first temperature sensors are connected to the PLC integrated machine.

7. The irrigation device according to claim 5 further comprising a plurality of spray pipes distributed in the field, all of the spray pipes are connected to a main pipeline buried underground, the pipe connector is a three-way pipe, a first water outflow port of the three-way pipe is connected to the main water pipe, a second water outflow port of the three-way pipe is connected to the main pipeline, an end of the main pipeline connected to the water outflow port is mounted with an electromagnetic valve connected to the PLC integrated machine.

8. The irrigation device according to claim 7 further comprising a plurality of the second temperature sensors distributed among the crops through a support bracket and communicating with the PLC integrated machine, wherein the support bracket comprises a base and a telescopic rod fixed on the base, each of the second temperature sensors is provided at a top of the telescopic rod, and a bottom of the base is provided with a plurality of clamping claws.

9. The irrigation device according to claim 8, wherein the telescopic rod is an electric push rod connected to the storage battery and the PLC integrated machine.

10. The irrigation device according to claim 5, wherein a top surface of the arc-shaped plastic cover is provided with a white reflective coating layer.

11. The irrigation device according to claim 5, wherein before turning on the control switch connecting the water pump and the storage battery and turning on the electromagnetic valve on the drip irrigation delivery lines in step S10, step S11, and step S14, the method further comprises:

A1: receiving soil temperature data transmitted by a plurality of first temperature sensors buried at a second depth in the field, and calculating an average of the soil temperature data of all the first soil temperature sensors to be regarded as an actual soil temperature; and A2: determining whether the actual soil temperature is greater than or equal to a soil temperature threshold, if yes, return to step A1, otherwise, go to step S10.

12. The irrigation device according to claim 5, wherein during a period from turning on the water pump for irrigation to stopping the irrigation, the method further comprises:

B1: measuring an electrical quantity of the storage battery in real time, and determining whether the electrical quantity is lower than an electrical quantity threshold, if yes, go to step B2, otherwise, go on performing step B1;

B2: turning off the control switch connecting the water pump and the storage battery, and turning on a control switch connecting the water pump and a municipal power supply; and B3: if the water outflow amount measured by the flow meter at the output end of the water pump is equal to the actual water usage amount, turning off the control switch connecting the water pump and the municipal power supply.

13. The irrigation device according to claim 5, wherein the method further comprises:

C1: receiving air temperature data transmitted by a plurality of second temperature sensors distributed among the crops through a support bracket, and calculating an average of the air temperature data of all the second air temperature sensors to be regarded as an actual air temperature;

C2: determining whether the actual air temperature is greater than or equal to a predetermined air temperature, if yes, go to step C3, otherwise, return to step C1; and C3: turning on the control switch connecting the water pump and the storage battery, turning on an electromagnetic valve on a main pipeline connected to a plurality of spray pipes to spray water on crop leaves for cooling, till a working time of the water pump reaches a third time duration, and stopping spraying water.

\* \* \* \* \*